Jan. 28, 1941.  A. NOJA  2,230,066
GAS LIGHTER
Filed June 14, 1938  2 Sheets-Sheet 2
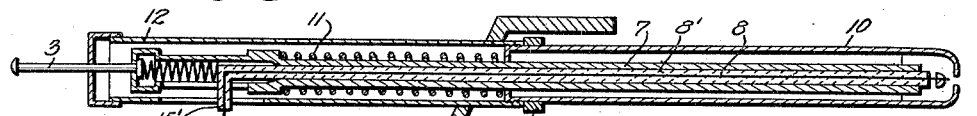
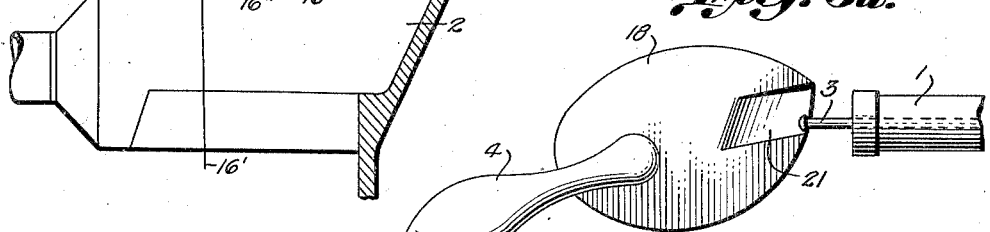
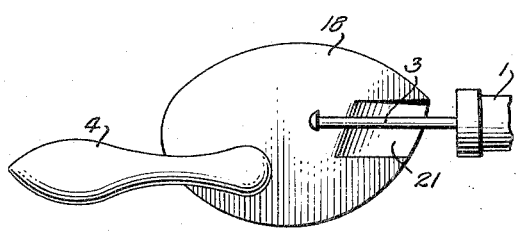
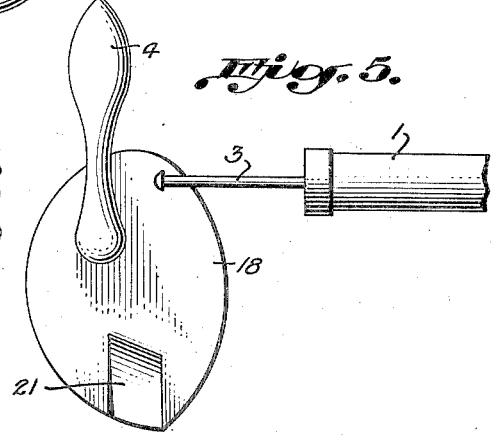
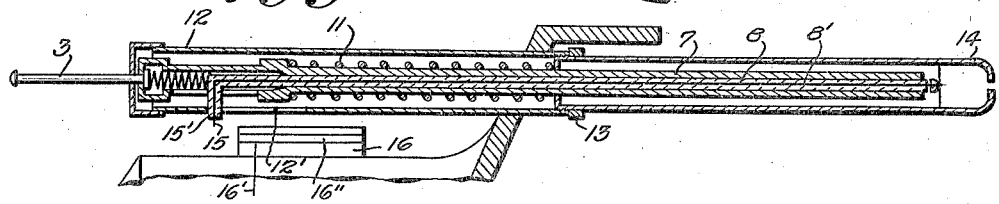
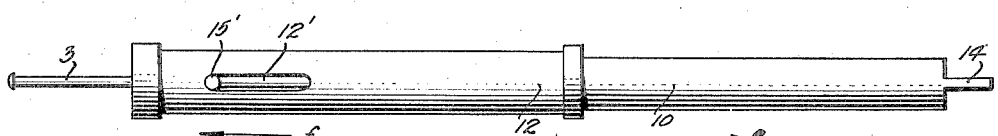
Inventor:
ANTONIO NOJA
By Mock, Blum
Attorneys Patented Jan. 28, 1941

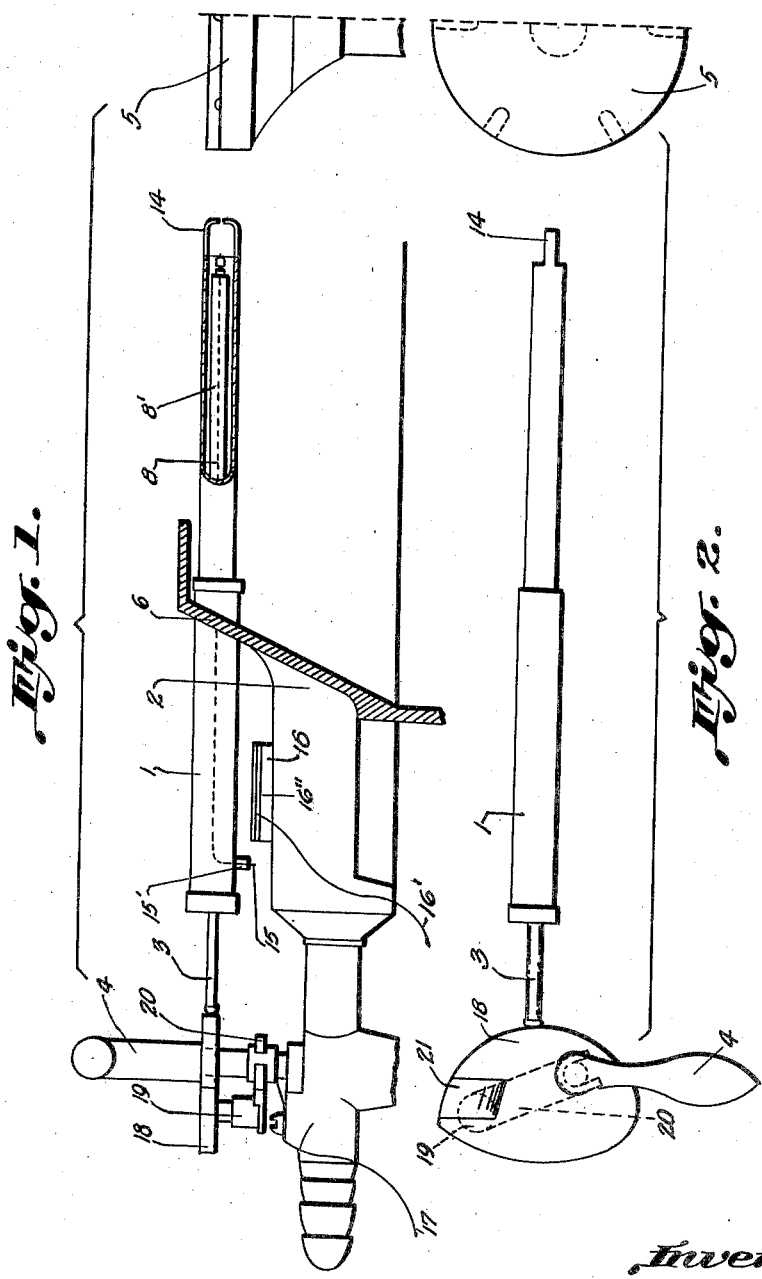

2,230,066

UNITED STATES PATENT OFFICE 2,230,066

GAS LIGHTER

Antonio Noja, Avezzano, Italy

Application June 14, 1938, Serial No. 213,569
In Italy June 24, 1937

9 Claims. (Cl. 175—115)

My invention relates to an electromechanical gas lighter having a safety-device for preventing the escape of unburnt gas. The lighter may be applied to any gas apparatus, such as kitchen-stoves, ranges, ovens, bath-stoves and the like. Its principal object is to permit the instantaneous lighting of gas by the single operation of opening the cock of the burner, and at the same time prevent the escape of unburnt gas that may occur in consequence of an improper operation of the cock. By means of a suitable device, the cock is connected with the lighter in such a way that it cannot assume other positions than the completely closed position or the opened position to different degrees while the gas is burning.

Therefore, the electromechanical gas lighter according to my invention, gives first of all, the advantage of a great economy of gas consumption owing to the instantaneous lighting of the gas, which occurs as soon as the cock is set into the open position and therefore does not allow the least waste of gas; and secondly, it gives the advantage of the great convenience resulting from the use of the gas apparatus which will be operated without the need of any accessory. A further advantage is that of giving the user of the gas apparatus the security and assurance that the cock can in no case, either by inadvertence or by accident, allow the escape of unburnt gas of which the serious consequences are well known.

The objects of the invention are realized by means of a suitable connecting device between the gas lighter and the cock of the burner. The gas lighter consists substantially of a lighter provided with a spring piston enclosing an electrically and thermically insulated electric wire. This piston, during its backward movements, produced by a cam disc applied to the cock of the burner, gives rise to the lighting spark when the cock is in the open position the said piston, being constantly pressed by its spring towards the cam of the cock, holds not only the cock in the closed position when the said cock is not turned into the fully open lighting position, but also pushes the cock into the closed position if the cock is inadvertently turned into an intermediate position in which an escape of unburnt gas might occur. After the start of the lighting spark and while the flame continues burning, the piston returns to its initial position owing to the pressure of its spring and at the same time slides on the sloping surface of a gap provided on the cam, which cam is guided so as to slide in the direction of the cock shaft, lowers and sets free the piston which returns to its original position while it holds the cam pressed down in the lowered position. The cock can now be freely turned in the usual way for the regulation of the flame. When the cock is closed in order to have the flame extinguished, the cam is set free from the downward pressure of the piston of the lighter, and returns to its initial raised position by the action of a suitable spring. The whole device, in this manner, returns to the original closed position.

The lighting spark of the lighter is produced by the contact of the wire, enclosed in the spring piston and connected to the source of current (not shown), with the ground connection to which the entire gas apparatus is connected.

The invention will now be more particularly explained with reference to the accompanying drawings which illustrate schematically and only by way of example a preferred form of embodiment of the invention. In the said drawings Fig. 1 shows a partially sectional side view of the gas lighter according to the invention applied to a gas stove, for example a kitchen-stove;

Fig. 2 shows a plan view corresponding to Fig. 1;

Fig. 3 shows the lighter, in vertical section, with the movable parts in readiness to cause an electric spark to be produced;

Figs. 3a, 4 and 5 show different positions of the cam disc provided on the cock of the stove, and Fig. 6 shows the lighter in vertical section, with the movable parts in the normal position, and Fig. 6a is a bottom view of the lighter.

In Figs. 1 and 2, 1 is the lighter applied to a stove 2 so that its spring piston 3 is situated facing the cock 4 of the stove, whereas the opposite end is situated near the burner 5 of the stove. Any type or construction of gas burner may be ignited with my improved device and this invention therefore does not concern itself with any particular construction of gas burner. The lighter 1 passes through the rib 6 of the stove to which it is rigidly connected in the position shown in Fig. 1. The lighter consists of a metal tube 7, in which is arranged an electric wire 8 wholly covered by a cover of refractory clay 8', so as to be wholly insulated both electrically and thermally, in order that it may be resistant to the heat produced by the burner when the burner is lighted. To the front end of the tube 7 is rigidly fixed the piston 3, whereas the rear end of the tube 7 slides in a tube 10. By means of a spring 11, the tube 7 and the piston 3 are constantly pushed forward in the direction of the arrow $f$ (Fig. 6a), this movement being limited by the closure on the tube 12 covering the spring 11, which tube is an extension of the tube 10 to which it is screwed or otherwise fixed at 13.

A thrust on the piston 3 in the direction opposed to the arrow *f* will therefore produce a backward movement of the tube 7 enclosing the wire 8, until the extremity of this wire projecting from the tube 7 comes into contact with the inwardly bent wings 14 of the tube 10 situated at the rear end of said tube, as shown in Figs. 3 and 6. The extremity 15 of the wire 8 which laterally projects from the tube 12 through the end 15' of the cover 8' comes into contact with a contact plate 16" in a member 16 (Fig. 1) which receives the current from any available source of current by means of a plug contact (not shown) connected by the wire 16' to the contact plate 16". It will be noted that the lower part of member 16 is of insulated material. The member 16 is suitably fixed on the body of the stove so as to allow the continuity of contact during the backward movement of the wire extremity 15 when the piston is moved in this direction, whereas the said wire extremity 15 breaks contact with the plate 16" in the advanced (i. e. normal) position of the piston 3, so that in this position the lighter does not receive current.

The tube 12 has a slot 12', as shown in Fig. 6, which allows the end 15' of the insulating cover 8' to slide backwards and forwards and, guides the said tube during the backward and forward movements. All the tubes composing the lighter are grounded by conductor 17 (Fig. 1) suitably attached to the stove. At the moment the wire 8 comes into contact with the wings 14 provided at the extremity of tube 10, an electric circuit is established.

According to the invention, the lighter is operated as follows, by opening the stove cock.

In the normal or closed position of the cock shown in Figs. 1 and 2, the piston 3 is placed at its extreme advanced position and rests with its head on the edge of a cam disc 18 rotationally rigid with the shaft of the cock 4 but movable downwards thereon. By means of a spring piston 19 rigidly mounted on an arm 20 fixed to the shaft of cock 4, the cam disc is constantly pressed upwards into the position shown in Fig. 1. When cock 4 is fully opened the cam 18 takes the position shown in Fig. 3a and pushes the piston 3 backwards and causes contact between the wire 8 and the wings 14, thus igniting the gas. In this position, the cam 18 presents to the piston 3 a sloping surface 21, on which the spring-loaded piston 3 is induced to slide forwards, thus lowering the cam disc 18 against the action of the spring 19 and tending to hold the cam disc in the raised position. The piston therefore returns to its normal position, but is now above the cam disc, as shown in Figs. 4 and 5. While the flame continues burning the cock 4 may therefore be freely adjusted between the position of Fig. 4 and that of Fig. 5, for the regulation of the flame. When the flame must be extinguished, the cock is turned to its closed position shown in Fig. 1, in which position the cam disc 18 clears the piston 3 and therefore returns to the initial raised position owing to the action of spring 19.

In this position the piston 3 acts, in cooperation with the cam disc 18, as a safety device for the closing of the cock. In fact, if the cock is casually turned from the closed towards the open position into a position in which the start of the spark does not occur, the piston 3 which is constantly and resiliently pressed by its spring 11 against the periphery of the cam disc 18, will always push the said disc back into the perfectly closed position owing to the shape of the cam face. The cock is therefore in no case allowed to rest at an intermediate position where it would permit an escape of gas, because as soon as the cock comes into the completely open position the instantaneous lighting occurs in the described manner.

By means of suitable arrangements the lighter according to the invention may be applied to any suitable kind of gas apparatus. If a stove or the like has several burners, it is understood that one contact member 16 may be used in conjunction with several igniting ovens.

It is to be understood that the invention is not limited to the described embodiment, but that it embraces all variations and modifications which may be considered suitable for carrying out the principle of the invention also by means of constructive particulars different from those which have been described.

What I claim is:

1. In an electromechanical lighter for gas burners, a control cam rotationally rigid with the cock of said burner, a slidable member engaging with the edge of said control cam so as to produce an electric sparking for the instantaneous lighting of the gas when the cock is turned almost fully open, a sloping surface on the control cam adapted to interrupt thereafter the action of the cam on the slidable member, a spring adapted to return the said slidable member to its initial position, an electrically and thermally insulated electric wire enclosed within the said slidable member and a cover for said slidable member provided with contact wings, said electric wire producing the start of the lighting spark by the contact which takes place in the open position of the cock, between the said electric wire connected to a source of current and the contact wings of the said cover, said contact wings being also connected to the source of current.

2. In an electromechanical lighter for gas burners, a stationary electrode, a control cam rotationally rigid with the cock of said burner, a slidable member having a second electrode, said slidable member engaging with the edge of said control cam so as to cause said electrodes to produce an electric sparking for the instantaneous lighting of the gas when the cock is turned almost fully open, a sloping surface arranged on the control cam adapted to allow the slidable member to lower the control cam on its return to the advanced initial position and a spring tending to press the control cam back to its raised position when the cock is turned to the closed position.

3. In an electromechanical lighter for gas burners, a stationary electrode, a control cam rotationally rigid with the cock of said burner, a slidable member having a second electrode, said slidable member engaging with the edge of said control cam so as to cause said electrode to produce an electric sparking for the instantaneous lighting of the gas when the cock is turned almost fully open, a sloping surface on the cam adapted to interrupt thereafter the action of the cam on the slidable member, a spring for returning the said slidable member to its initial position so as to lower the said control cam into an inoperative position when said slidable member acts on said sloping surface, and for closing the cock by pressing the slidable member against the edge of the control cam before said sloping surface reaches said slidable member.

4. In an electromechanical lighter for gas burners, a control cam rotationally rigid with the cock of said burner, a slidable member engaging with the edge of the said control cam so as to produce an electric sparking for the instantaneous lighting of the gas when the cock is turned almost fully open, a sloping surface on the control cam adapted to interrupt thereafter the action of the cam on the slidable member, a spring to return the said slidable member to its initial position, an electrically and thermally insulated electric wire enclosed within the said slidable member, a cover for said slidable member provided with contact wings, said electric wire producing the start of the lighting spark by the contact which takes place in the open position of the cock, between the said electric wire connected to a source of current and the contact wings of the said cover, a ground connection, attached to any point of the stove, grounding the cover of the slidable member enclosing the insulated electric wire, and a contact member for connecting the source of current to the electric wire through a projection of the said electric wire extending out of the cover, which contact member is fed by a source of current and is extended to all of the burners of the gas apparatus.

5. In an electromechanical lighter for gas burners a control cam rotationally rigid with the cock of the burner, a slidable member engaging with the edge of the said control cam so as to produce an electric sparking for the instantaneous lighting of the gas when the cock is turned almost fully open, a sloping surface on the control cam adapted to interrupt thereafter the action of the cam on the slidable member, a spring to return the said slidable member to its initial position, an electrically and thermally insulated electric wire enclosed within the said slidable member, a cover for the slidable member provided with contact wings, said electric wire producing the start of the lighting spark by the contact which takes place in the open position of the cock, between the said electric wire connected to a source current and the contact wings of the said cover, a ground connection, attached to any point of the stove, grounding the cover of the slidable member enclosing the insulated electric wire, a contact member for connecting the source of current to the electric wire through a projection of the said electric wire extending out of the cover, which contact member is fed by a contact plug of the source of current and is extended to all of the burners of the gas apparatus, and a resistance connected to the contact of the contact plug box engaging with the source of current.

6. In an electromechanical lighter for gas burners, a control cam rotationally rigid with the cock of said burner and slidable on the shaft of said cock, a slidable member connected with lighting means and engaging with the edge of said control cam so as to produce an electric sparking for the instantaneous lighting of the gas when the cock is turned almost fully open, spring means pressing said slidable member against the edge of the said control cam and opposing a resistance to the opening of the cock until the lighting position is reached, a sloping surface on the control cam, said sloping surface being so positioned on said cam that after the lighting position has been reached the slidable member engages said sloping surface, thus forcing the cam to a position below said slidable member and thus allowing the free regulation of the flame, and spring means adapted to press the control cam to its raised position, when the cock is turned on to the closed position.

7. In an electromechanical lighter for gas burners, a control cam rotationally rigid with the cock of the said burner and slidable on the shaft of said cock, a slidable member, connected with lighting means and engaging with the edge of said control cam so as to produce an electric sparking for the instantaneous lighting of the gas when the cock is turned almost fully open, spring means pressing said slidable member against the edge of said control cam and opposing a resistance to the opening of the cock until the lighting position is reached, a sloping surface on the control cam, said sloping surface being so positioned on said cam that after the lighting position has been reached the slidable member engages said sloping surface, thus forcing the cam to a position below said slidable member and thus allowing the free regulation of the flame, spring means adapted to press the control cam to its raised position, when the cock is turned to the closed position, the said lighting means comprising an electrically and thermally insulated electric wire enclosed within the said slidable member, a cover for said slidable member provided with contact wings and producing the start of the lighting spark by the contact which takes place in the open position of the cock between the said electric wire connected to a source of current and the contact wings of the said cover, said contact wings being also connected to the source of current.

8. In an electromechanical lighter for gas burners, a control cam rotationally rigid with the cock of said burner and slidable on the shaft of said cock, a slidable member, connected with lighting means and engaging with the edge of said control cam so as to produce an electric sparking for the instantaneous lighting of the gas when the cock is turned almost fully open, spring means pressing said slidable member against the edge of the said control cam and opposing a resistance to the opening of the cock until the lighting position is reached, a sloping surface on the control cam, said sloping surface being so positioned on said cam that after the lighting position has been reached the slidable member engages said sloping surface, thus forcing the cam to a position below said slidable member and thus allowing the free regulation of the flame, spring means adapted to press the control cam to its raised position, when the cock is turned to the closed position, the said lighting means comprising an electrically and thermally insulated electric wire enclosed within the said slidable member, a cover for said slidable member provided with contact wings and producing the start of the lighting spark by the contact which takes place in the open position of the cock between the said electric wire connected to a source of current and the contact wings of said cover, said contact wings being also connected to the source of current and a ground connection attached to any point of the stove, grounding the cover of the slidable member enclosing the insulated electric wire, and a contact member for connecting the source of current to the electric wire through a projection of the said electric wire extending out of the cover, said contact member being fed by the source of current and is extended to all of the burners of the gas apparatus.

9. In an electromechanical lighter for gas burners, a control cam rotationally rigid with the cock of said burner and slidable on the shaft of said cock, a slidable member, connected with lighting means and engaging with the edge of said control cam so as to produce an electric sparking for the instantaneous lighting of the gas when the cock is turned almost fully open, spring means pressing said slidable member against the edge of the said control cam and opposing a resistance to the opening of the cock until the lighting position is reached, a sloping surface on the control cam, said sloping surface being so positioned on said cam that after the lighting position has been reached the slidable member engages said sloping surface, thus forcing the cam to a position below said slidable member and thus allowing the free regulation of the flame, spring means adapted to press the control cam to its raised position, when the cock is turned to the closed position, the said lighting means comprising an electrically and thermally insulated electric wire enclosed within the said slidable member, a cover for said slidable member provided with contact wings and producing the start of the lighting spark by the contact which takes place in the open position of the cock between the said electric wire connected to a source of current and the control wings of the said cover, said contact wings being also connected to the source of current, and a ground connection attached to any point of the stove grounding the cover of the slidable member enclosing the insulated electric wire, and a contact member for connecting the source of current to the electric wire through a projection of the said electric wire extending out of the cover, said contact member being fed by a source of current and is extended to all of the burners of the gas apparatus and a resistance connected to the contact plug box engaging with the source of current.

ANTONIO NOJA.